(12) United States Patent
Xu et al.

(10) Patent No.: US 9,560,591 B2
(45) Date of Patent: Jan. 31, 2017

(54) METHOD FOR SAVING ENERGY FOR WIRELESS SENSOR NETWORK

(71) Applicant: Tsinghua University, Beijing (CN)

(72) Inventors: Ke Xu, Beijing (CN); Yi Qu, Beijing (CN); Wenlong Chen, Beijing (CN); Youjian Zhao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/406,581

(22) PCT Filed: Jan. 21, 2014

(86) PCT No.: PCT/CN2014/071014
§ 371 (c)(1),
(2) Date: Dec. 9, 2014

(87) PCT Pub. No.: WO2014/187160
PCT Pub. Date: Nov. 27, 2014

(65) Prior Publication Data
US 2015/0181520 A1    Jun. 25, 2015

(30) Foreign Application Priority Data
May 21, 2013   (CN) .......................... 2013 1 0190377

(51) Int. Cl.
*G08C 17/00*    (2006.01)
*H04W 52/02*    (2009.01)
*H04W 84/18*    (2009.01)

(52) U.S. Cl.
CPC ..... *H04W 52/0216* (2013.01); *H04W 52/0219* (2013.01); *H04W 52/0229* (2013.01); *H04W 84/18* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 7,647,078 | B2 * | 1/2010 | Kim .................. | H04W 52/0225 455/127.1 |
| 2005/0122233 | A1 * | 6/2005 | Isoyama .................. | H04Q 9/00 340/870.11 |
| 2006/0271661 | A1 * | 11/2006 | Qi ....................... | H04L 41/0823 709/223 |
| 2008/0253327 | A1 * | 10/2008 | Kohvakka ............. | H04W 16/14 370/330 |
| 2009/0168670 | A1 * | 7/2009 | Yang ................... | H04L 41/0823 709/223 |
| 2011/0064026 | A1 * | 3/2011 | Niedermeier .......... | G01D 21/00 370/328 |
| 2011/0137614 | A1 * | 6/2011 | Wheeler ................. | H04L 67/12 702/188 |

(Continued)

*Primary Examiner* — Anh-Vu Ly

(57) ABSTRACT

A method for saving energy for a wireless sensor network is provided, comprising: introducing a high energy device; defining a sensor node within a coverage of the high energy device as a source node or a forwarding node by the high energy device based on a routing relationship; sending sensed data to the high energy device by the source node at any time; and selecting a forwarding node at a working time to forward the data by the high energy device while making the other forwarding nodes at a dormancy time.

11 Claims, 4 Drawing Sheets

(56) References Cited

U.S. PATENT DOCUMENTS

| | | | | |
|---|---|---|---|---|
| 2012/0022831 A1* | 1/2012 | Leguay | ................ | H04W 16/18 |
| | | | | 702/188 |
| 2013/0135994 A1* | 5/2013 | Michel | .............. | H04W 52/0206 |
| | | | | 370/229 |
| 2014/0328240 A1* | 11/2014 | Munari | ............... | H04W 40/005 |
| | | | | 370/311 |

* cited by examiner

METHOD FOR SAVING ENERGY FOR WIRELESS SENSOR NETWORK

FIELD

The present disclosure relates to a wireless communication field, and more particularly relates to a method for saving energy for a wireless sensor network.

BACKGROUND

A wireless sensor network, which is composed of numerous sensor nodes distributed within a specific region, is a current research hotspot. The sensor nodes are capable of sensing circumstance, monitoring a specific event and performing wireless communication. After collecting data, the sensor node sends the data in a single-hop or multi-hop manner to a data sink where the data is stored for local use or uploaded for other network (such as the Internet) use. Ever since it was proposed at an end of last century, the wireless sensor network is developed rapidly and widely applied in fields of military affairs, transportation, environmental monitoring, etc.

However, the wireless sensor network also faces plenty of practical problems. One of severest challenges is that energy of sensor nodes is extremely restricted, which is mainly caused by following factors. Firstly, in most cases, sensor nodes rely on batteries, which cannot provide enough energy, as power supplies. Secondly, sensors are usually deployed in a region that is quite hard for humans to reach, which leads to difficulties in battery changing. Thirdly, as there are a lot of nodes in the wireless sensor network, a battery changing requires a large amount of manpower.

In recent years, an energy restriction challenge of the wireless sensor network changes. As application scenarios of the wireless sensor network change gradually from the specialized fields like military affairs and scientific research to people's daily life, such as healthcare, smart home, movement identification and the like. Moreover, the deployment of the sensor nodes gets closer and closer to people's living and working place, where various wireless devices coexist. Thus, how to save energy for the sensor nodes in these new application scenarios is of great significance.

SUMMARY

The present disclosure seek to solve at least one of the problems existing in the prior art. Accordingly, the present disclosure aims to provide a method for saving energy for a wireless sensor network.

The method for saving energy for a wireless sensor network according to the present disclosure comprises: step 1: defining each sensor node in the wireless sensor network as an ordinary node, initializing the each sensor node, and introducing and initializing a high energy device; step 2: determining a sensor node within a coverage of the high energy device, wherein the high energy device and each sensor node within the coverage are mutual neighbors; step 3: judging a node type of the each sensor node within the coverage, calculating a neighbor difference degree $diff_{d,s}$ between the high energy device and the each sensor node within the coverage, packing the node type and the neighbor difference degree $diff_{d,s}$ as a dormancy message packet, and sending the dormancy message packet to the each sensor node within the coverage, wherein the node type comprises a forwarding node and a source node; step 4: obtaining a corresponding dormancy message packet thereof by the each sensor node within the coverage, executing step 5-step 7 if the sensor node is the forwarding node, and executing step 8 if the sensor node is the source node; step 5: a plurality of forwarding nodes working intermittently by turns, calculating a working time $T_{wakeup}^{s}$ and a dormancy time $T_{sleep}^{s}$ based on the node type and the neighbor difference degree $diff_{d,s}$ thereof by each forwarding node, packing the working time $T_{wakeup}^{s}$ and the dormancy time $T_{sleep}^{s}$ as a dormancy notice packet and sending the dormancy notice packet to each sensor node within a coverage of the forwarding node, wherein the working time $T_{wakeup}^{s}$ comprises a first working time $t_{aff}^{s}$, a second working time $t_{slot}$ and a third working time $t_{tail}$; step 6: when an ordinary node outside the coverage of the high energy device receives the dormancy notice packet, changing the node type of the ordinary node into an affected node, if the forwarding node is a next hop of the ordinary node; step 7: sending sensed data to the forwarding node by the affected node when the forwarding node is at the first working time $t_{aff}^{s}$, sending the sensed data to the forwarding node by the high energy device when the forwarding node is at the second working time $t_{slot}$, and then transferring the sensed data in a data aggregation direction by a selected forwarding node; and step 8: a plurality of source nodes working continuously, sending sensed data to the high energy device in real time by each source node, sending the sensed data to the forwarding node at the second working time $t_{slot}$ by the high energy device, and transferring the sensed data in the data aggregation direction by the selected forwarding node.

In one embodiment, step 1 comprises: step 11: setting a first set threshold $N_0$, a third set threshold $N_2$ an arrival packet number $SNum_{s,d}$ with an initial value of 0 and a neighbor difference degree $diff_{d,s}$ with an initial value of 0 by the sensor node; and step 12: setting an arrival packet broadcasting period T, a second set threshold $N_1$ and a high energy device set parameter $DNum_d$ with an initial value of 0 by the high energy device.

In one embodiment, step 2 comprises: step 21: packing a high energy device address $Addr_d$ as an arrival packet and broadcasting the arrival packet in the arrival packet broadcasting period T by the high energy device; step 22: increasing the arrival packet number $SNum_{s,d}$ by 1, each time when the sensor node receives the arrival packet, and executing step 23 when the arrival packet number $SNum_{s,d}$ is greater than the first set threshold $N_0$; step 23: packing a sensor node address $Addr_s$, a next-hop sensor node address $NextHopAddr_s$ and a sensor node address neighbor table $Neib_s$ as a neighbor information packet, and sending the neighbor information packet to the high energy device by the sensor node, determining the sensor node within the coverage of the high energy device by the high energy device; step 24: constructing a neighbor information table $NeibTab_d$ based on the neighbor information packet by the high energy device, the neighbor information table $NeibTab_d$ comprising a sensor node address $Neib_d$ within the coverage of the high energy device, a next-hop sensor node address $Neib\text{-}NextHop_d$ of the sensor node within the coverage of the high energy device and a sensor node address $NeibNeib_d$ within a coverage of each sensor node within the coverage of the high energy device; and step 25: increasing the high energy device set parameter $DNum_d$ by 1, each time when the arrival packet is sent after the high energy device receives the neighbor information packet for a first time, and executing step 3 when the high energy device set parameter $DNum_d$ is greater than the second set threshold $N_1$.

In one embodiment, a neighbor difference degree $\text{diff}_{d,i}$ of an $i^{th}$ element in the sensor node address neighbor table $\text{Neib}_s$ is calculated by a formula:

$$\text{diff}_{d,i} = 1 - \frac{\text{SimNum}_{d,i}}{H_i}$$

where $\text{SimNum}_{d,i}$ is a number of same elements in $\text{Neib}_d$ and $\text{Neib}_i$, and $H_i$ is a number of elements in $\text{Neib}_i$.

In one embodiment, the working time $T_{wakeup}^s$ and the dormancy time $T_{sleep}^s$ are calculated by formulas:

$$T_{period} = N_f \times t_{slot}$$
$$T_{wakeup}^s = t_{aff}^s + t_{slot} + t_{tail}$$
$$t_{aff}^s = \frac{\text{diff}_{d,s} + T_{period}}{N_s}$$
$$T_{sleep}^s = T_{period} - T_{wakesup}^s$$

where $T_{period}$ represents a working-dormancy period, $N_f$ represents a number of the forwarding nodes, and $N_s$ represents a number of the source nodes.

In one embodiment, step 5 further comprises: calculating a forwarding rank $\text{rank}_s$ of the forwarding node in all $N_f$ forwarding nodes according to the neighbor difference degree $\text{diff}_{d,s}$ by the forwarding node.

In one embodiment, step 7 further comprises: caching the sensed data by the affected node when the forwarding node is at the dormancy time $T_{sleep}^s$ and sending the sensed data to the forwarding node by the affected node when the forwarding node is at a first working time $t_{aff}^s$ of a next period.

In one embodiment, step 8 further comprises: sending the sensed data to the forwarding node at the second working time $t_{slot}$ by the high energy device according to the forwarding rank $\text{rank}_s$ of the forwarding node.

In one embodiment, the high energy device is proved to have left the wireless sensor network, if the source node and the forwarding node do not receive the arrival packet from the high energy device within a time $N_2 \times T$.

In one embodiment, the high energy device comprises a sensor, a laptop, a tablet PC and a mobile phone with a constant power supply.

In one embodiment, step 7 further comprises: at each moment at least one forwarding node being at the second working time $t_{slot}$ to transfer the data and other forwarding nodes being at the dormancy time.

The method for saving energy for a wireless sensor network according to the present disclosure is flexible, green and energy-saving.

Additional aspects and advantages of the present disclosure are given in the following description, part of which becomes apparent from the following description or appreciated from the practice according to the present disclosure.

BRIEF DESCRIPTION OF THE DRAWINGS

These and other aspects and advantages of embodiments of the present disclosure will become apparent and more readily appreciated from the following descriptions made in conjunction with the accompanying drawings, in which.

DETAILED DESCRIPTION

Figure 1:
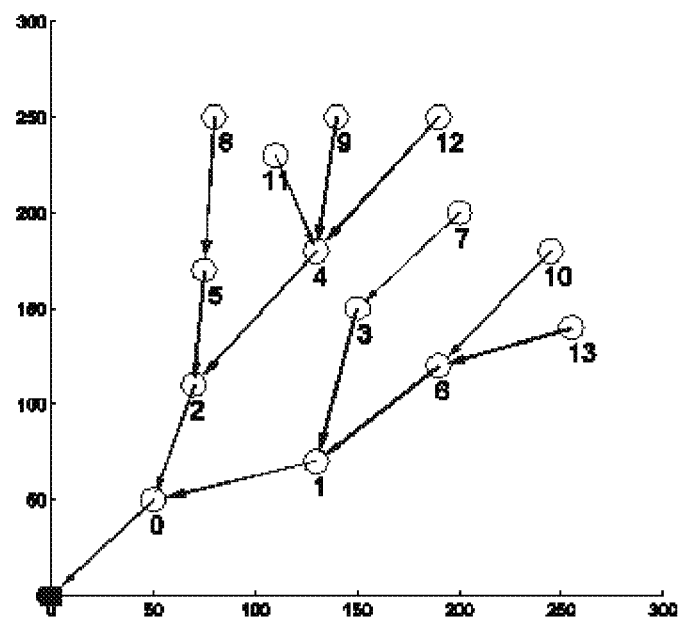
FIG. 1 is a topological graph of a wireless sensor network before an introduction of a high energy device according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Terms such as "first" and "second" are used herein for purposes of description and are not intended to indicate or imply relative importance or significance.

FIG. 1 is a topological graph of a wireless sensor network before an introduction of a high energy device according to an embodiment of the present disclosure. In FIG. 1, a small box in a lower left corner represents a data sink in the wireless sensor network, to which all data is sent in the end; small circles represent sensor nodes with serial numbers ranging from 0 to 13, in which each sensor node generates data and forwards data generated by other sensor nodes; and arrows indicate data sending directions. For example, a sensor node 12 sends an obtained data to a next hop, i.e. a sensor node 4, and the sensor node 4 sends the data received from the sensor node 12 and the data generated by itself to a sensor node 2, and so on.

Figure 2:
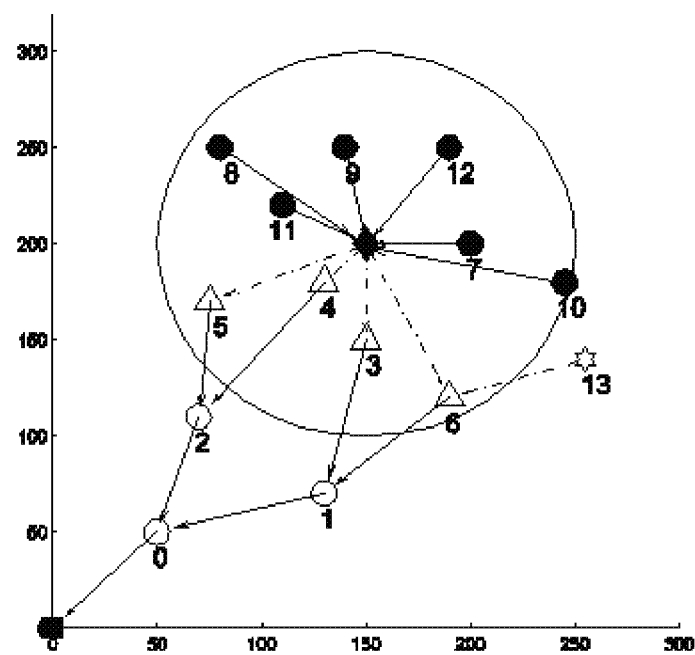
FIG. 2 is a topological graph of the wireless sensor network with the introduction of the high energy device according to an embodiment of the present disclosure.
Figure 3:
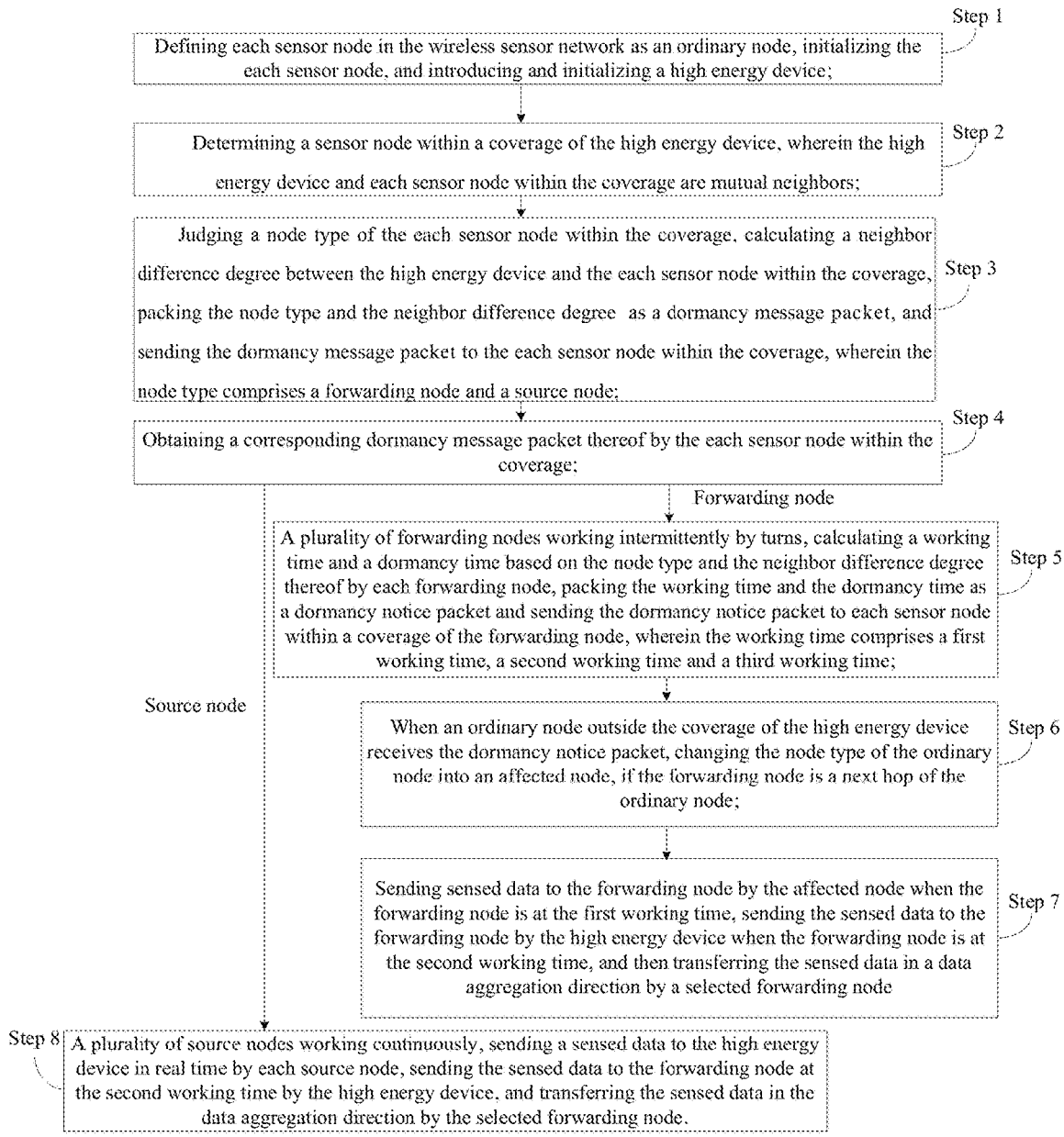
FIG. 3 is a flow chart of a method for saving energy for the wireless sensor network according to an embodiment of the present disclosure.

FIG. 2 is a topological graph of the wireless sensor network with the introduction of the high energy device according to an embodiment of the present disclosure. FIG. 3 is a flow chart of a method for saving energy for the wireless sensor network according to an embodiment of the present disclosure. The method comprises following steps.

At step 1, each sensor node in the wireless sensor network is defined as an ordinary node and initialized, and the high energy device is introduced and initialized.

In an embodiment of the present disclosure, wireless communication modules with the same number as the sensor nodes are provided to the high energy device so as to realize a direct communication between the high energy device and the sensor nodes. The high energy device is, for example, a sensor, a laptop, a tablet PC or a mobile phone with a constant power supply. Moreover, each sensor node (represented as s, s=1, 2, 3, . . . , G, where G represents a total number of the sensor nodes in the wireless sensor network) in the wireless sensor network is defined as the ordinary node, i.e. $\text{Type}_s = \text{normal}$.

Step 1 comprises the following steps.

At step 11, a first set threshold $N_0$, a third set threshold $N_2$, an arrival packet number $SNum_{s,d}$ with an initial value of 0 and a neighbor difference degree $diff_{d,s}$ with an initial value of 0 are set by the sensor node.

At step 12, an arrival packet broadcasting period T, a second set threshold $N_1$ and a high energy device set parameter $DNum_d$ with an initial value of 0 are set by the high energy device.

At step 2, a sensor node within a coverage of the high energy device is determined, and the high energy device and each sensor node within the coverage are mutual neighbors.

Step 2 comprises the following steps.

At step 21, a high energy device address $Addr_d$ is packed as an arrival packet and the arrival packet in the arrival packet broadcasting period T is broadcasted by the high energy device.

As shown in FIG. 2, provided that the high energy device (represented as a rhombus) remains in a network region shown in FIG. 2, the high energy device broadcasts the arrival packet in the arrival packet broadcasting period T, and sensor nodes 3-12 within the coverage (i.e. a region defined by a big circle) record the number of the arrival packets from the high energy device. At step 22, the arrival packet number $SNum_{s,d}$ is increased by 1 each time when the sensor node receives the arrival packet, and step 23 is executed when the arrival packet number $SNum_{s,d}$ is greater than the first set threshold $N_0$.

The aim of setting the first set threshold $N_0$ is to ensure that the each sensor node receives the arrival packet for a certain times, which indicates that the high energy device is introduced into the wireless sensor network stably. Only when the arrival packet number $SNum_{s,d}$ is greater than the first set threshold $N_0$, may the sensor node select that the high energy device have been introduced into the wireless sensor network.

At step 23, a sensor node address $Addr_s$, a next-hop sensor node address $NextHopAddr_s$ and a sensor node address neighbor table $Neib_s$ are packed as a neighbor information packet. The neighbor information packet is sent to the high energy device by the sensor node, and the sensor node within the coverage of the high energy device is determined by the high energy device.

When the arrival packet number $SNum_{s,d}$ is greater than the first set threshold $N_0$, sensor nodes 3-12 send the neighbor information packet including the sensor node address $Addr_s$, the next-hop sensor node address $NextHopAddr_s$ and the sensor node address neighbor table $Neib_s$ to the high energy device.

For example, a content of the neighbor information packet sent by a sensor node 8 is $\{Addr_8, NextHopAddr_8, Neib_8\}=\{8,5,\{4,5,9,11\}\}$, where $Neib_s=\{NeibAddr_{s,1}, NeibAddr_{s,2}, \ldots, NeibAddr_{s,Hs}\}$, and Hs represents the number of the sensor nodes within a coverage of the sensor node.

Further, a result of a binary exponential backoff conducted once for the neighbor information packet is sent to a medium access control (MAC) layer of the sensor node and then sent to the high energy device.

At step 24, a neighbor information table $NeibTab_d$ is constructed by the high energy device based on the neighbor information packet, in which the neighbor information table $NeibTab_d$ comprises a sensor node address $Neib_d$ within the coverage of the high energy device, a next-hop sensor node address $NeibNextHop_d$ of the sensor node within the coverage of the high energy device and a sensor node address $NeibNeib_d$ within a coverage of each sensor node within the coverage of the high energy device.

After receiving the neighbor information packet, the high energy device records the sensor node address $Addr_s$, the next-hop sensor node address $NextHopAddr_s$ and the sensor node address neighbor table $Neib_s$, and then based on the above information constructs a neighbor information table $NeibTab_d$, $NeibTab_d=\{Neib_d, NeibNextHop_d, NeibNeib_d\}$, where $Neib_d$ represents the sensor node address within the coverage of the high energy device, $Neib_d=\{Addr_1, Addr_2, \ldots, Addr_K\}$ (K represents the number of the sensor nodes within the coverage of the high energy device), $NeibNextHop_d$ represents the next-hop sensor node address of the sensor node within the coverage of the high energy device, $NeibNextHop_d=\{NextHopAddr_1, NextHopAddr_2, \ldots, NextHopAddr_K\}$, and $NeibNeib_d$ represents the sensor node address within the coverage of each sensor node within the coverage of the high energy device, $NeibNeib_d=\{Neib_1, Neib_2, \ldots, Neib_K\}$.

At step 25, the high energy device set parameter $DNum_d$ is increased by 1 each time when the arrival packet is sent after the high energy device receives the neighbor information packet for a first time, and step 3 is executed when the high energy device set parameter $DNum_d$ is greater than the second set threshold $N_1$.

The aim of setting the second set threshold $N_1$ is to ensure that all the sensor nodes within the coverage of the high energy device send the neighbor information packets thereof to the high energy device, which is to avoid inconsistent operations of the sensor nodes due to data loss.

At step 3, a node type of the each sensor node within the coverage of the high energy device is judged, a neighbor difference degree $diff_{d,s}$ between the high energy device and the each sensor node within the coverage is calculated. The node type and the neighbor difference degree $diff_{d,s}$ are packed as a dormancy message packet, and the dormancy message packet is sent to the each sensor node within the coverage of the high energy device, in which the node type comprises a forwarding node and a source node.

The high energy device judges the node type based on a routing relationship among the sensor nodes. For example, as shown in FIG. 1 and FIG. 2, for the sensor node 12, the high energy device finds that the sensor node 4 which is the next hop of the sensor node 12 is within the coverage of the high energy device, and thus judges that the sensor node 12 is a source node, i.e. $Type_{12}$=source; and for the sensor node 4, the high energy device finds that the sensor node 2 which is the next hop of sensor node 4 is not within the coverage of the high energy device, and thus judges that the sensor node 4 is a forwarding node, i.e. $Type_4$=forward. It is the same with the other sensor nodes.

The neighbor difference degree $diff_{d,s}$ between the high energy device and the each sensor node within the coverage of the high energy device is calculated. First, the number of same elements in $Neib_d$ and $Neib_i$ is calculated and assumed as $SimNum_{d,i}$, and $Neib_i$ is an element in $Neib_s$, then:

$$diff_{d,i} = 1 - \frac{SimNum_{d,i}}{H_i}$$

where $H_i$ is the number of elements in $Neib_i$, and i ranges from 1 to K.

For example, for the sensor node 4, $Neib_4=\{2,3,5,6,7,8,11,12\}$, and for the high energy device, $Neib_d=\{3,4,5,6,7,8,9,10,11,12\}$. The number of same elements in $Neib_4$ and $Neib_d$ $SimNum_{d,4}=7$, then:

$$\text{diff}_{d,4} = 1 - \frac{SimNum_{d,4}}{H_4} = 1 - \frac{7}{8} = 0.125$$

The node type of the sensor node within the coverage of the high energy device $\text{NeibType}_d = \{\text{Type}_1, \text{Type}_2, \ldots, \text{Type}_K\}$ and the neighbor difference degree $\text{NeibDiff}_d = \{\text{diff}_{d,1}, \text{diff}_{d,2}, \ldots, \text{diff}_{d,K}\}$ are packed as the dormancy message packet, and the dormancy message packet is broadcast to the each sensor node within the coverage of the high energy device. A broadcast time $t_0$ is recorded meanwhile.

At step 4, a corresponding dormancy message packet thereof is obtained by the each sensor node within the coverage. Step 5-step 7 are executed if the sensor node is the forwarding node, and step 8 is executed if the sensor node is the source node.

At step 5, a plurality of forwarding nodes work intermittently by turns, a working time $T_{wakeup}^s$ and a dormancy time $T_{sleep}^s$ are calculated based on the node type and the neighbor difference degree $\text{diff}_{d,s}$ thereof by each forwarding node. The working time $T_{wakeup}^s$ and the dormancy time $T_{sleep}^s$ are packed as a dormancy notice packet and the dormancy notice packet is sent to each sensor node within a coverage of the forwarding node, in which the working time $T_{wakeup}^s$ comprises a first working time $t_{aff}^s$, a second working time $t_{slot}$ and a third working time $t_{tail}$.

In one embodiment, the working time $T_{wakeup}^s$ and the dormancy time $T_{sleep}^s$ are calculated by formulas:

$$T_{period} = N_f \times t_{slot}$$
$$T_{wakeup}^s = t_{aff}^s + t_{slot} + t_{tail}$$
$$t_{aff}^s = \frac{\text{diff}_{d,s} + T_{period}}{N_s}$$
$$T_{sleep}^s = T_{period} - T_{wakesup}^s$$

where $T_{period}$ is a working/dormancy period and $t_{tail}$ is 12 ms preferably herein.

Figure 4:
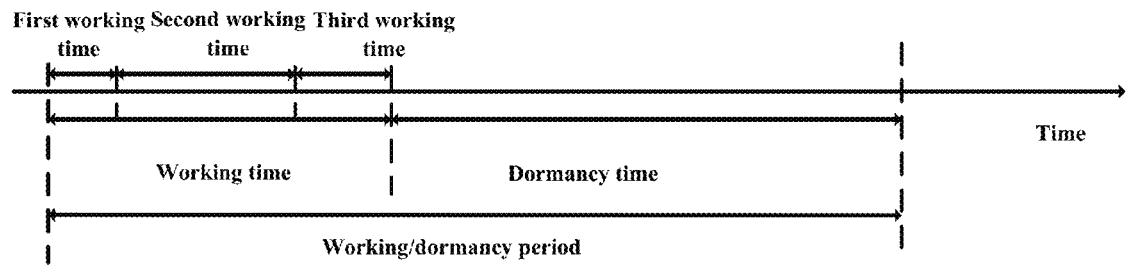
FIG. 4 is a schematic diagram of a dormancy period of a forwarding node according to an embodiment of the present disclosure.
Figure 5:
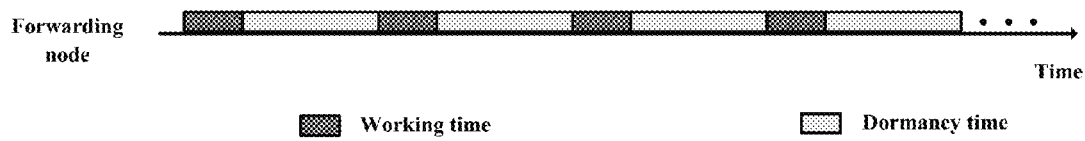
FIG. 5 is a schematic diagram of a working/dormancy regularity of the forwarding node according to an embodiment of the present disclosure.

It is to be noted that the forwarding node calculates the working/dormancy period $T_{period}$ based on the information in the dormancy message packet. The working/dormancy periods $T_{period}$ of all the forwarding nodes are the same. Then, the forwarding node works and remains dormant according to the regularity shown in FIG. 4 and FIG. 5. The forwarding node becomes dormant after working for the working time $T_{wakeup}^s$ and then wakes up to re-work after the dormancy time $T_{sleep}^s$, which is repeated.

The forwarding node packs the working time $T_{wakeup}^s$ and the dormancy time $T_{sleep}^s$ as the dormancy notice packet and sends the dormancy notice packet to the sensor node within the coverage of the forwarding node.

Further, if the sensor node is the forwarding node, i.e. $\text{Type}_s = \text{forward}$, then the forwarding node calculates a rank $\text{rank}_s$ of the forwarding node in the whole forwarding nodes according to the neighbor difference degree $\text{diff}_{d,s}$. All the forwarding nodes work intermittently by turns according to the rank, $\text{rank}_s = 1, 2, 3, \ldots, N_f$, where $N_f$ represents a total number of the forwarding nodes in the dormancy message packet and a total number of the source nodes meets $N_s = K - N_f$.

At step 6, when an ordinary node outside the coverage of the high energy device receives the dormancy notice packet, the node type of the ordinary node is changed into an affected node, if the forwarding node is a next hop of the ordinary node.

The high energy device, the source node and other forwarding nodes ignore the dormancy notice packet, and the ordinary node checks the packet source address after receiving the dormancy notice packet. If the packet source address is the next hop of the ordinary node, the node type of the ordinary node is changed into the affected node, and the ordinary node adjusts the data thereof based on a state of the next hop. For example, the node type of an ordinary node 13 is changed into the affected node after the ordinary node 13 receives the dormancy notice packet from a forwarding node 6 which is the next hop of the ordinary node 13.

At step 7, sensed data is sent to the forwarding node by the affected node when the forwarding node is at the first working time $t_{aff}^s$ and the sensed data is sent to the forwarding node by the high energy device when the forwarding node is at the second working time $t_{slot}$, and then the sensed data is transferred in a data aggregation direction by a selected forwarding node. The sensed data is cached by the affected node when the forwarding node is at the dormancy time, and the sensed data is sent to the forwarding node by the affected node when the forwarding node is at the first working time $t_{aff}^s$ of a next period.

When the forwarding node 6 is at the dormancy time, the sensed data is cached by the affected node 13. When the forwarding node 6 is at the first working time, the affected node 13 first judges whether the cache is empty or not after receiving the sensed data. If yes, the received sensed data is sent to the forwarding node 6 directly; and if no, the just received sensed data is sent after the cached data is sent.

At step 8, a plurality of source nodes work continuously. Sensed data is sent to the high energy device in real time by each source node and the sensed data is sent to the forwarding node at the second working time $t_{slot}$ by the high energy device, and the sensed data is transferred in cot the data aggregation direction by the selected forwarding node.

It is to be noted that the selected forwarding node may transfer the sensed data in the data aggregation direction at any of the first, second and third working times. The third working time is set to avoid a great data delay in some particular cases, for example, if there is no third working time and the selected forwarding node receives data from the high energy device at the end of the second working time, there may be an MAC access delay occurring to the forwarding node when the forwarding node sends the data, and if the access delay results in a failure sending of the data within the second working time, the forwarding node becomes dormant, and thus the data has to be sent after the dormancy time, which leads to a great data delay. By setting the third working time, the data received in the first and second working times may be sent within a working time of this period.

Figure 6:
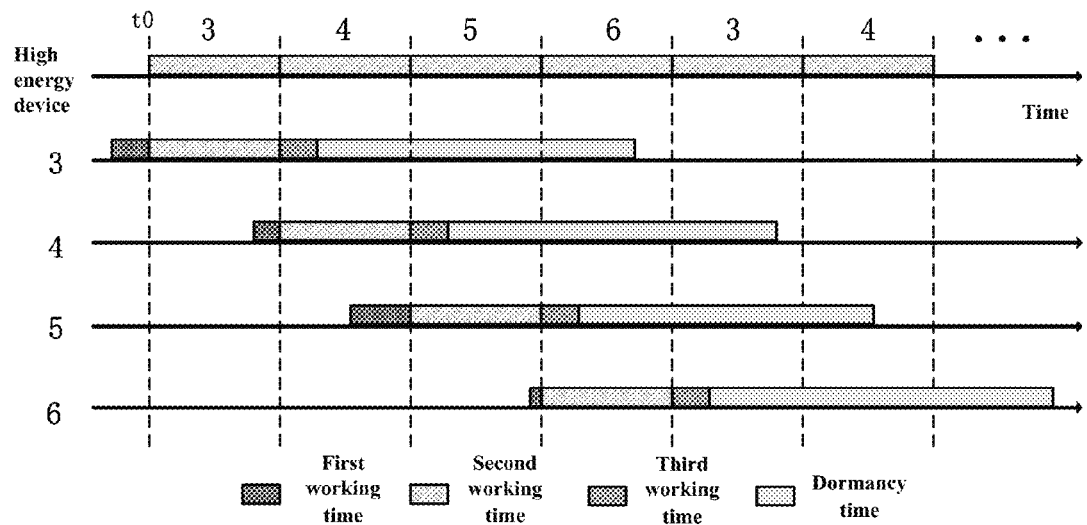
FIG. 6 is a schematic diagram of the forwarding node at a second working time selected by the high energy device according to an embodiment of the present disclosure.

A plurality of source nodes work continuously and send the data generated thereby and the data received from other sensor nodes to the high energy device. FIG. 6 is a schematic diagram of the forwarding node at the second working time selected by the high energy device according to an embodiment of the present disclosure. The high energy device calculates the working time and the dormancy time of each forwarding node within the coverage of the high energy device by using the method in step 5. After receiving the data sent by the source nodes, the high energy device sends the data to the forwarding nodes at the second working time and the forwarding nodes forward the data in the data aggregation direction.

It is to be noted that although in FIG. 6 the high energy device at each moment is only corresponding to one forwarding node at the second working time, in practice, a plurality of forwarding nodes may be at the second working time thereof to forward the data and the other forwarding nodes may be at the dormancy time.

With the method for saving energy for the wireless sensor network according to above embodiments of the present disclosure, the sensor node type is changed by the introduction of the high energy device and different data transmission modes are used based on different sensor node types, which saves the energy. However, the high energy device is only introduced within a certain period of time, and may leave the wireless sensor network at any time. The high energy device is proved to have left the wireless sensor network, if the source node and the forwarding node do not receive the arrival packet from the high energy device within a time $N_2 \times T$. The forwarding node is responsible for informing the affected node of a notification that the high energy device is out of service. Then, the network returns to its original state before the introduction of the high energy device, as shown in FIG. 1. Here the source node sends the data to a next hop thereof rather than to the high energy device, and the affected node sends the received data to a next hop thereof directly. Meanwhile, all the sensor nodes are waiting for an introduction of a next high energy device.

Figure 7:
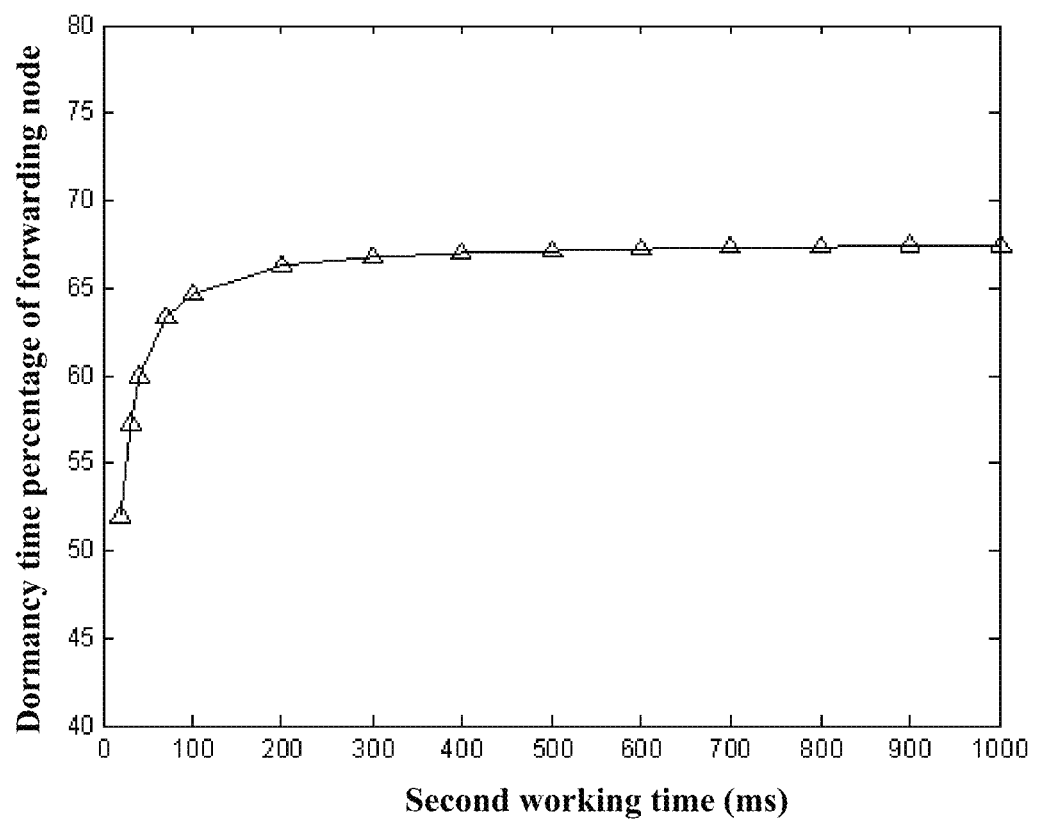
FIG. 7 is a schematic diagram of a dormancy time percentage of a forwarding node in a total time according to an embodiment of the present disclosure.

FIG. 7 is a schematic diagram of a dormancy time percentage of a forwarding node in a total time according to an embodiment of the present disclosure. Sensor nodes 3-6 become the forwarding nodes available for dormancy. The energy saving brought by the high energy device is directly relevant to the dormancy time of the forwarding nodes. As shown in FIG. 7, the dormancy time percentage of the forwarding node in the total time is increased from 52.5% to 67%, as the second working time is increased from 20 ms to 1 s. Theoretically, an energy consumption is correspondingly decreased by 52.5%-67%.

With the method for saving energy for the wireless sensor network according to embodiments of the present disclosure, a network task burdened by the sensor nodes is shared by the high energy device, and the dormancy times of the sensor nodes are coordinately adjusted by the high energy device, which saves the sensor node energy and extends a working time of the sensor network.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for saving energy for a wireless sensor network, comprising:
    step 1: defining each sensor node in the wireless sensor network as an ordinary node, initializing the each sensor node, and introducing and initializing a high energy device;
    step 2: determining a sensor node within a coverage of the high energy device, wherein the high energy device and each sensor node within the coverage are mutual neighbors;
    step 3: judging a node type of the each sensor node within the coverage, calculating a neighbor difference degree $diff_{d,s}$ between the high energy device and the each sensor node within the coverage, packing the node type and the neighbor difference degree $diff_{d,s}$ as a dormancy message packet, and sending the dormancy message packet to the each sensor node within the coverage, wherein the node type comprises a forwarding node and a source node;
    step 4: obtaining a corresponding dormancy message packet thereof by the each sensor node within the coverage, executing step 5-step 7 if the sensor node is the forwarding node, and executing step 8 if the sensor node is the source node;
    step 5: a plurality of forwarding nodes working intermittently by turns, calculating a working time $T_{wakeup}^s$ and a dormancy time $T_{sleep}^s$ based on the node type and the neighbor difference degree $diff_{d,s}$ thereof by each forwarding node, packing the working time $T_{wakeup}^s$ and the dormancy time $T_{sleep}^s$ as a dormancy notice packet and sending the dormancy notice packet to each sensor node within a coverage of the forwarding node, wherein the working time $T_{wakeup}^s$ comprises a first working time $t_{aff}^s$, a second working $t_{slot}$ and a third working time $t_{tail}$;
    step 6: when an ordinary node outside the coverage of the high energy device receives the dormancy notice packet, changing the node type of the ordinary node into an affected node, if the forwarding node is a next hop of the ordinary node;
    step 7: sending sensed data to the forwarding node by the affected node when the forwarding node is at the first working time $t_{aff}^s$, sending the sensed data to the forwarding node by the high energy device when the forwarding node is at the second working time $t_{slot}$, and then transferring the sensed data in a data aggregation direction by a selected forwarding node; and
    step 8: a plurality of source nodes working continuously, sending sensed data to the high energy device in real time by each source node, sending the sensed data to the forwarding node at the second working time $t_{slot}$ by the high energy device, and transferring the sensed data in the data aggregation direction by the selected forwarding node.

2. The method according to claim 1, wherein step 1 comprises:

step 11: setting a first set threshold $N_0$, a third set threshold $N_2$, an arrival packet number $SNum_{s,d}$ with an initial value of 0 and a neighbor difference degree $diff_{d,s}$ with an initial value of 0 by the sensor node; and step 12: setting an arrival packet broadcasting period T, a second set threshold $N_1$ and a high energy device set parameter $DNum_d$ with an initial value of 0 by the high energy device.

3. The method according to claim 2, wherein step 2 comprises:

step 21: packing a high energy device address $Addr_d$ as an arrival packet and broadcasting the arrival packet in the arrival packet broadcasting period T by the high energy device;

step 22: increasing the arrival packet number $SNum_{s,d}$ by 1, each time when the sensor node receives the arrival packet, and executing step 23 when the arrival packet number $SNum_{s,d}$ is greater than the first set threshold $N_0$;

step 23: packing a sensor node address $Addr_s$, a next-hop sensor node address $NextHopAddr_s$ and a sensor node address neighbor table $Neib_s$ as a neighbor information packet, and sending the neighbor information packet to the high energy device by the sensor node, determining the sensor node within the coverage of the high energy device by the high energy device;

step 24: constructing a neighbor information table $NeibTab_d$ based on the neighbor information packet by the high energy device, the neighbor information table $NeibTab_d$ comprising a sensor node address $Neib_d$ within the coverage of the high energy device, a next-hop sensor node address $NeibNextHop_d$ of the sensor node within the coverage of the high energy device and a sensor node address $NeibNeib_d$ within a coverage of each sensor node within the coverage of the high energy device; and step 25: increasing the high energy device set parameter $DNum_d$ by 1, each time when the arrival packet is sent after the high energy device receives the neighbor information packet for a first time, and executing step 3 when the high energy device set parameter $DNum_d$ is greater than the second set threshold $N_1$.

4. The method according to claim 3, wherein a neighbor difference degree $diff_{d,i}$ of an $i^{th}$ element in the sensor node address neighbor table $Neib_s$ is calculated by a formula:

$$diff_{d,i} = 1 - \frac{SimNum_{d,i}}{H_i}$$

where $SimNum_{d,i}$ is a number of same elements in $Neib_d$ and $Neib_i$, and $H_i$ is a number of elements in $Neib_i$.

5. The method according to claim 1, wherein the working time $T_{wakeup}^s$ and the dormancy time $T_{sleep}^s$ are calculated by formulas:

$$T_{period} = N_f \times t_{slot}$$

$$T_{wakeup}^s = t_{aff}^s + t_{slot} + t_{tail}$$

$$t_{aff}^s = \frac{diff_{d,s} + T_{period}}{N_s}$$

$$T_{sleep}^s = T_{period} - T_{wakeup}^s$$

where $T_{period}$ represents a working-dormancy period, $N_f$ represents a number of the forwarding nodes, and $N_s$ represents a number of the source nodes.

6. The method according to claim 1, wherein step 5 further comprises: calculating a forwarding rank $rank_s$ of the forwarding node in all $N_f$ forwarding nodes according to the neighbor difference degree $diff_{d,s}$ by the forwarding node.

7. The method according to claim 1, wherein step 7 further comprises: caching the sensed data by the affected node when the forwarding node is at the dormancy time $T_{sleep}^s$, and sending the sensed data to the forwarding node by the affected node when the forwarding node is at a first working time $t_{aff}^s$ of a next period.

8. The method according to claim 6, wherein step 8 further comprises: sending the sensed data to the forwarding node at the second working time $t_{slot}$ by the high energy device according to the forwarding rank $rank_s$ of the forwarding node.

9. The method according to claim 3, wherein the high energy device is proved to have left the wireless sensor network, if the source node and the forwarding node do not receive the arrival packet from the high energy device within a time $N_2 \times T$.

10. The method according to claim 1, wherein the high energy device comprises a sensor, a laptop, a tablet PC and a mobile phone with a constant power supply.

11. The method according to claim 1, wherein step 7 further comprises: at each moment at least one forwarding node being at the second working time $t_{slot}$ to transfer the data and other forwarding nodes being at the dormancy time.

* * * * *